(No Model.)
E. P. HAFF.
CROCHETING NEEDLE.
No. 249,759. Patented Nov. 22, 1881.
Witnesses
F. W. Adams
Frank Thomason
Inventor
Edw. P. Haff.
per W. E. Dayton,
Attorney.

UNITED STATES PATENT OFFICE.

EDWARD P. HAFF, OF BROOKLYN, NEW YORK.

CROCHETING-NEEDLE.

SPECIFICATION forming part of Letters Patent No. 249,759, dated November 22, 1881.

Application filed August 1, 1881. (No model.)

To all whom it may concern:

Be it known that I, EDWARD P. HAFF, of Brooklyn, in the county of Kings and State of New York, have invented a certain new and useful Improvement in Crocheting-Hooks; and I do hereby declare that the following is a full, clear, and exact description thereof, reference being had to the accompanying drawing, and to the letters of reference marked thereon, which form a part of this specification.

This invention relates to a class of crocheting implements which have a metal hook inserted in a bone or rubber handle; and it consists in providing an additional hook on the end of the handle opposite the metal hook mentioned, as herein shown and claimed, as an improvement in this class of implements.

In the drawing, A is the metal part, having the hook $a$ at its extremity.

B is the handle, of bone, rubber, or other suitable material, and in accordance with my improvement is provided with a hook, $b$, at its free end larger than the hook $a$.

I claim as my invention—

The improved crochet-needle described, consisting of the metal needle A, provided with the hook $a$, inserted in the handle B, provided with the hook $b$, as shown.

In testimony that I claim the foregoing as my invention I affix my signature in presence of two witnesses.

EDWD. P. HAFF.

Witnesses:
J. W. JAROS,
MORRIS S. WISE.